(12) United States Patent
Fayeulle et al.

(10) Patent No.: US 6,538,849 B1
(45) Date of Patent: Mar. 25, 2003

(54) DIAMOND-PATTERN DIRECTED TIPPING SLIP MAGNETIC HEAD

(75) Inventors: Serge Jacques Fayeulle, Longmont, CO (US); James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/503,612

(22) Filed: Feb. 11, 2000

Related U.S. Application Data
(60) Provisional application No. 60/119,775, filed on Feb. 11, 1999.

(51) Int. Cl.[7] ................................................ G11B 5/60
(52) U.S. Cl. .................. 360/236.3; 360/237; 360/235.4
(58) Field of Search ............................... 360/236.3, 237, 360/237.1, 235.4, 235.5, 235.6, 235.7, 235.8, 235.9, 236.1, 236.2, 236.4, 236.5, 236.6, 236.7, 236.8, 236.9, 135, 97.01

(56) References Cited

U.S. PATENT DOCUMENTS

| | | | | |
|---|---|---|---|---|
| 5,267,104 A | 11/1993 | Albrecht et al. | ......... | 360/97.02 |
| 5,278,711 A | 1/1994 | Gregory et al. | ......... | 360/97.02 |
| 5,285,337 A | 2/1994 | Best et al. | ............... | 360/97.02 |
| 5,418,667 A | 5/1995 | Best et al. | .................. | 360/237 |
| 5,455,730 A | 10/1995 | Dovek et al. | ............... | 360/317 |
| 5,499,149 A | 3/1996 | Dovek | ..................... | 360/234.1 |
| 5,550,693 A | 8/1996 | Hendriks et al. | ........ | 360/236.6 |
| 5,557,488 A | 9/1996 | Hamilton et al. | ........ | 360/245.9 |
| 5,659,447 A | 8/1997 | Gregory et al. | ............. | 360/237 |
| 5,841,608 A | 11/1998 | Kasamatsu et al. | ...... | 360/236.6 |
| 5,898,540 A | 4/1999 | Maruyama et al. | ...... | 360/246.2 |
| 6,130,808 A * | 10/2000 | Yotsuya | ................... | 360/235.4 |
| 6,160,683 A * | 12/2000 | Boutaghou | ............... | 360/237.1 |
| 6,212,042 B1 * | 4/2001 | Gui et al. | ................ | 360/236.6 |
| 6,215,621 B1 * | 4/2001 | Boutaghou | ............... | 360/236.6 |
| 6,233,118 B1 * | 5/2001 | Boutaghou et al. | ...... | 360/235.4 |
| 6,236,543 B1 * | 5/2001 | Han et al. | .................. | 36/236.6 |
| 6,243,233 B1 * | 6/2001 | Yamamoto et al. | ...... | 360/236.6 |
| 6,246,538 B1 * | 6/2001 | Kasamatsu et al. | ...... | 360/97.01 |
| 6,268,978 B1 * | 7/2001 | Tani et al. | ................... | 360/135 |

* cited by examiner

Primary Examiner—Brian E. Miller
Assistant Examiner—Tianjie Chen
(74) Attorney, Agent, or Firm—Merchant & Gould P.C.

(57) ABSTRACT

A head slider apparatus, to be attached to a magnetic head in a magnetic disc drive, for preventing bimodal stiction by preventing tipping of the head slider on its rear edge by forcing tipping of the head slider towards one of the head slider's corners. Subsequently, the head slider also mitigates any resultant stiction related to the corner tipping of the head slider that may occur. The head slider apparatus has a diamond-shaped pattern of four pads. The diamond-shaped pattern of the pads directs tipping of the head slider towards its corners. The head slider also has pads positioned in each corner of the head slider to address any resultant stiction caused by the corner tipping.

9 Claims, 3 Drawing Sheets

Stiction behavior of a classical SLIP head

Stiction behavior of a SLIP head according to a preferred embodiment of the present invention

DIAMOND-PATTERN DIRECTED TIPPING SLIP MAGNETIC HEAD

RELATED APPLICATIONS

This application claims the benefit of provivonal application Serial No. 60/119,775 entitled DIAMOND-PATTERN DIRECTED TIPPING SLIP HEAD, filed Feb. 11, 1999.

FIELD OF THE INVENTION

This invention relates generally to a head slider of a magnetic recording drive, and, more particularly, to a head slider having an improved pad design so as to reduce bimodal stiction.

BACKGROUND OF THE INVENTION

Disc drives are information storage devices that use a rotatable disc with concentric data tracks containing the information, a magnetic head or transducer for reading and/or writing data onto the various tracks, and an actuator connected to a carrier for the head for moving the head to the desired track and maintaining it over the track centerline during read or write operations. There are typically a plurality of discs separated by spacer rings and stacked on a hub that is rotated by a disc drive motor. A housing supports the drive motor and head actuator and surrounds the head and disc to provide a substantially sealed environment for the head-disc interface.

In conventional magnetic recording disc drives, the head carrier is an air-bearing slider that rides on a bearing of air above the disc surface when the disc is rotating at its operational speed. The slider is maintained next to the disc surface by a relatively fragile suspension that connects the slider to the actuator. The slider is either biased toward the disc surface by a small spring force from the suspension, or is self-loaded to the disc surface by means of a "negative-pressure" air-bearing surface on the slider.

"Load/unload" disc drives mechanically unload the slider from the disc when the power is turned off, typically by means of a ramp which contacts the suspension when the actuator is moved, and then load the slider back to the disc when the disc has reached a speed sufficient to generate the air bearing.

In contrast to "load/unload" disc drives, in a contact start/stop ("CSS") disc drive, a flying head operated according to a CSS method is adopted. In the CSS method, the magnetic head makes contact with the surface of the magnetic disc surface during start and stop operations when there is insufficient disc rotational speed to maintain the air bearing. The head slider of the magnetic head is lifted up from the magnetic disc surface when the magnetic disc drive is in operation, the head slider flying over the magnetic disc surface due to an air flow on the magnetic disc surface generated by the rotation of the magnetic disc. The head slider flies according to a principle of a dynamic air pressure bearing at the magnetic disc surface. Therefore, the head slider of the magnetic head slides over the magnetic disc surface when the disc starts and stops. In this case, the read-write magnetic head device is attached to the head slider.

It is known that minimizing the head-disc spacing (HDS) is desirable because the amplitude of the read signal from the disc increases with decreasing HDS. Higher recording densities can thus be achieved.

To make the head fly, a convex portion is formed on a surface of the head slider facing the magnetic disc. Air flow causes a floating force to be generated in the convex portion and an air inflow region of the convex portion is formed in a taper shape. The convex portion is generally called a rail surface (or a flying surface). Before starting the operation of the disc drive or after stopping its operation, the rail surface of the head slider makes contact with the magnetic disc surface. Therefore, to prevent wear and/or damage of the magnetic disc surface, a protective film made of a hard material such as carbon or the like is formed on a recording layer of the magnetic disc. In addition, a lubricant layer is formed on the protective film to reduce friction and wear of the protective film, thereby improving the durability of the protective film.

If the disc has a smooth non-textured surface, the contact area of the magnetic disc with the head, when the head is rested in a stop condition, becomes larger compared to a textured surface. A very high static friction force, called stiction, (i.e., adhesion) between the head slider to the magnetic disc occurs, and a strength of the stiction increases due to an increased area of contact. The strength of the stiction has to be overcome in order for the disc to begin or resume spinning.

To suppress the stiction, it has been known to crown-process the head slider flying surface facing the magnetic disc along its longitudinal direction to decrease the contact area of the head slider with the magnetic disc.

Also, it has been known to deposit discrete pads, or projections, on the air-bearing surface of the head slider facing the magnetic disc. Theses pads or projections protrude below the level of the surface of the head slider to further decrease the contact area between the magnetic disc and the head slider. The height of the pads, also called "SLIP pads," have to be accurately adjusted to have a stable operation of the magnetic disc apparatus when the flying of the head is started or stopped. Furthermore, the entire weight of the head slider rests on the pads which have a small surface. This causes large friction between the projection surfaces and the disc surface. As a result, the pads wear out rapidly.

The SLIP pads that have been designed so far have had limited success in solving one type of high stiction called bimodal stiction. Bimodal stiction is related to the tipping of the head slider on its rear edge. The bimodal stiction behavior of a classical head slider with SLIP pads, i.e. SLIP head, is characterized by a constant variation of the stiction force during a CSS test between a low value and a value that can be as high as several tens of grams. Also contributing to a very high stiction force is the formation of a large meniscus of the lubrication on the magnetic disc. FIG. 1 shows a schematic of the tipping mechanism and the formation of a meniscus contributing to the very high stiction force. As can be seen in FIG. 1, when the SLIP head tips on its rear edge due to the positioning of the SLIP pads, a large meniscus of the lubricant on the magnetic disc is formed between the magnetic head and SLIP head.

Accordingly, there is a need for a SLIP head that prevents tipping of the SLIP head on its rear edge in order to alleviate bimodal stiction. The design of the projections, i.e., contact pads, must also account for the curvature of the head (i.e., the crown and camber), preventing unintended contact between the air-bearing surface and the disc.

SUMMARY OF THE INVENTION

In accordance with the present invention, the above and other problems are solved by providing a magnetic head with a diamond-pattern directed tipping SLIP head which prevents tipping of the SLIP head on its rear edge by forcing tipping towards a corner. The design of the SLIP head then mitigates resulting stiction related to any corner tipping of the SLIP head. Furthermore, the diamond-pattern of the pads accounts for the crown and camber of the head, preventing any unintended contact between the air-bearing surface and disc.

The present invention SLIP head provides a design of the pads on the head slider in a diamond-shaped pattern. The diamond-pattern has four pads, or projections, positioned in a diamond shape on the head slider. Accordingly, one of the four pads is positioned on the longitudinal axis of the head slider, proximate the rear edge of the head slider. This pad positioned on the longitudinal axis, proximate the rear edge of the head slider, directs tipping toward one of the corners of the head, and inhibits direct rearward tipping onto the rear edge of the head slider.

The present invention also provides four additional pads, hereinafter called corner tip pads, on the head slider in a rectangular-shaped pattern. The rectangular-pattern, also having four pads, has each of the corner tip pads positioned near each of the four corners of the head slider. When tipping of the head slider towards a corner occurs, as directed by the diamond-pattern of the other four pads, these corner tip pads then prevent the formation of a large meniscus around the contact area. The corner tip pads also prevent line contact, which occurs when the longitudinal edge of the head slider is allowed to come into contact with the magnetic disc. Accordingly, due to the reduced area of contact between the head slider and magnetic disc, the reduced area of meniscus, and the permitted separation of the disc and head slider, the level of stiction is decreased.

In the present invention, the mechanism of back tipping and high stiction resulting from it is no longer random and unpredictable as with the classical SLIP heads. This results from tipping being forced towards the corner of the head. Knowing what direction the tipping will occur, the tipping to a corner can be controlled by the placement of corner tipping pads to control the formation of menisci. Furthermore, the head-disc budget concern, which is the separation between the magnetic disc and head, can be more easily addressed by modifying the rear pad location on the rear air-bearing surface and changing the pad heights.

In use in a CSS disc drive, the magnetic head, and attached SLIP head of the present invention, make contact with the surface of the magnetic disc during start and stop operations when there is insufficient disc rotational speed to maintain the air bearing. When this occurs, the diamond-pattern pads of the SLIP head of the present invention will direct any tipping to occur towards the corners of the SLIP head, away from the rear edge of the SLIP head. Consequently, this tipping will avoid the problem of bimodal stiction. Furthermore, by controlling the tipping and knowing in what direction it will occur, the strategically placed corner tip pads of the present invention will then prevent line contact and the formation of a large meniscus around the contact area.

While an embodiment of the present invention can be used in a magnetic recording device, it should be noted that the present invention could be adapted for use on other systems where stiction and its related factors as discussed herein are of concern. Such systems would include, for example, types of storage drives wherein a recording head comes to rest against a medium.

In sum, the present invention represents a significant improvement over the prior magnetic heads in many ways. The SLIP head in accordance with the present invention allows for directed tipping to avoid bimodal stiction. These and various other features as well as advantages, which characterize the present invention, will be apparent from a reading of the following detailed description and a review of the associated drawings.

DETAILED DESCRIPTION

The present invention provides a diamond-pattern directed tipping SLIP head, to be attached to a magnetic head for use in a magnetic recording drive, and which prevents tipping of the SLIP head on its rear edge by forcing tipping towards a corner of the SLIP head, thereby eliminating bimodal stiction. The SLIP head of the present invention then mitigates stiction related to any corner tipping of the head.

Figure 2A:
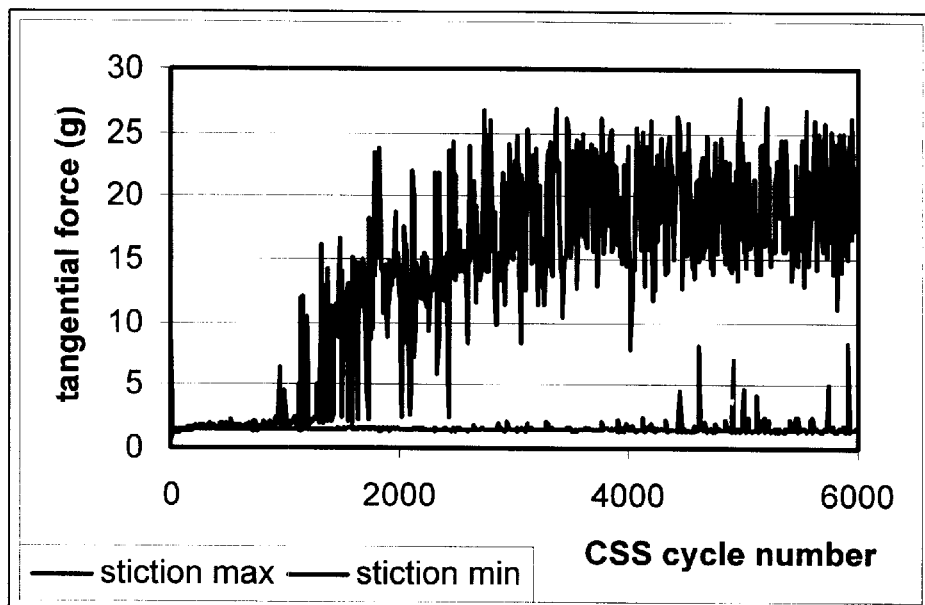
FIGS. 2a and 2b show comparison graphs representing bimodal stiction behavior of a conventional SLIP head and a SLIP head according to a preferred embodiment of the present invention.
Figure 2B:
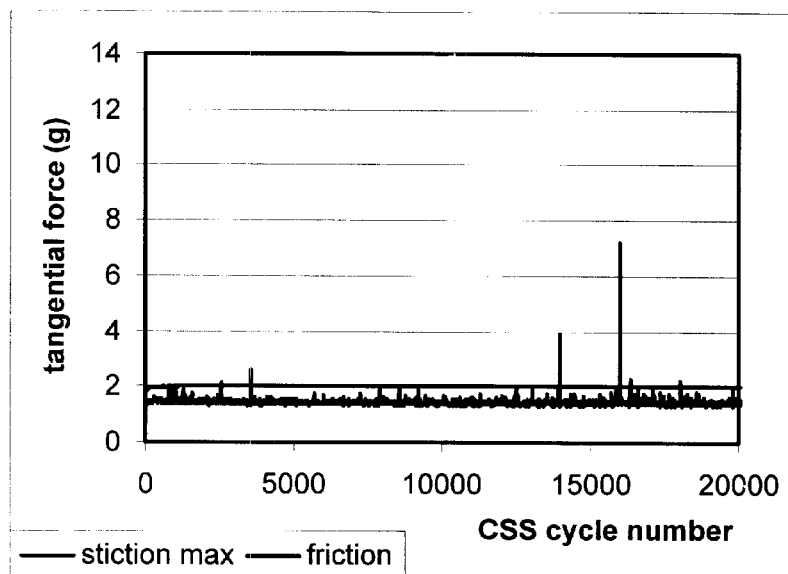

Bimodal stiction is related to the tipping of the head slider on its rear edge. The bimodal stiction behavior of a classical SLIP head is characterized by a constant variation of the stiction force during a CSS test between a low value and a value that can be as high as several tens of grams, as can be seen in FIG. 2a. The bimodal stiction behavior of a SLIP head according to a preferred embodiment of the present invention substantially reduces the variation of stiction force, as can be seen in FIG. 2b.

Figure 3:
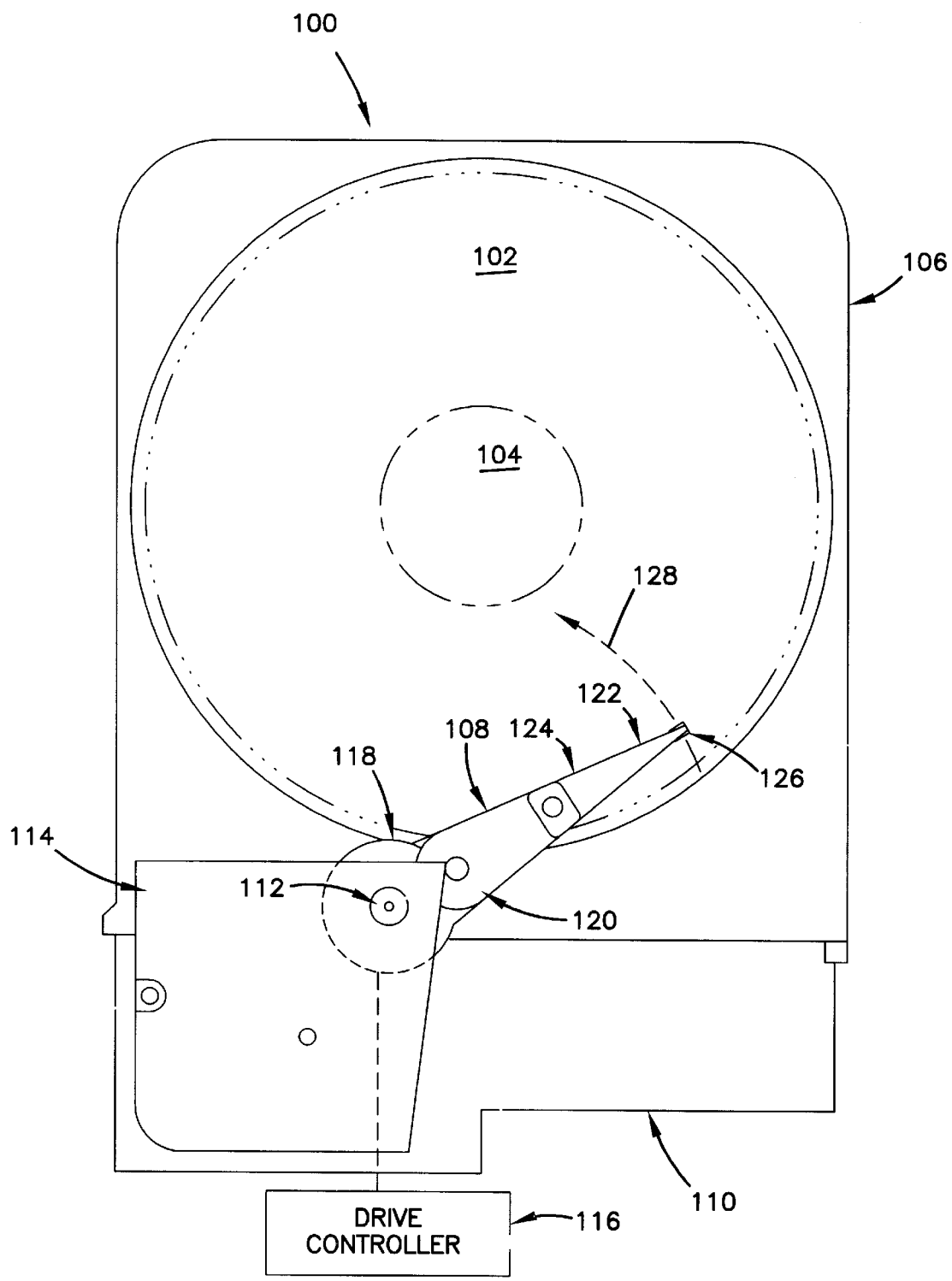
FIG. 3 is a top view of a conventional disc drive.

Referring now to FIG. 3, which illustrates a conventional disc drive. FIG. 3 is a top view of a conventional disc drive 100. Disc drive 100 includes a magnetic disc 102 mounted for rotational movement about an axis defined by spindle 104 with housing 106. Disc drive 100 also includes a stacked actuator system 108 mounted to a base plate 110 of the housing 106 and pivotally movable relative to disc 102 about axis 112. A cover 114 covers a portion of stacked actuator system 108. Drive controller 116 is coupled to stacked actuator system 108. Generally, drive controller 116 is either mountable within disc drive 100 or is located outside of disc drive 100 with suitable connection to stacked actuator system 108.

Stacked actuator system 108 includes an actuator arm assembly 118, a rigid support member 120, and a head gimbal assembly 122. Head gimbal assembly 122 includes a load beam or flexure arm 124 coupled to rigid member 120, and a head slider 126 coupled by a gimbal (not shown) to load beam 124. Slider 126 supports a transducer for reading information from disc 102 and encoding information on disc 102.

During operation, drive controller 116 received position information indicating a portion of disc 102 to be accessed. Drive controller 116 receives the position information from the operator, from a host computer or from another suitable controller. Based on the position information, drive controller 116 provides a position signal to stacked actuator system 108. The position causes stacked actuator system 108 to pivot or rotate about axis 112. This, in turn, causes slider 126 and the transducers mounted on slider to move radially over the surface of the disc 102 in a generally arcuate path as indicated by arrow 128. Once the transducer is properly positioned, drive controller 116 then executes a desired read or write operation.

Figure 1:
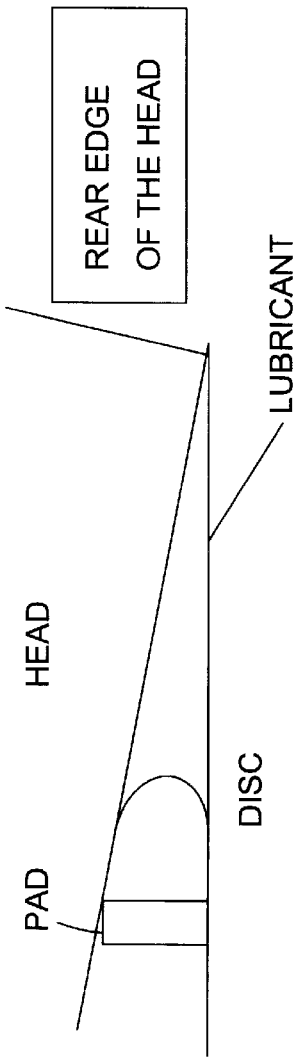
FIG. 1 shows a schematic of the tipping mechanism and the formation of a meniscus responsible for the very high stiction force of a conventional SLIP head.
Figure 4:
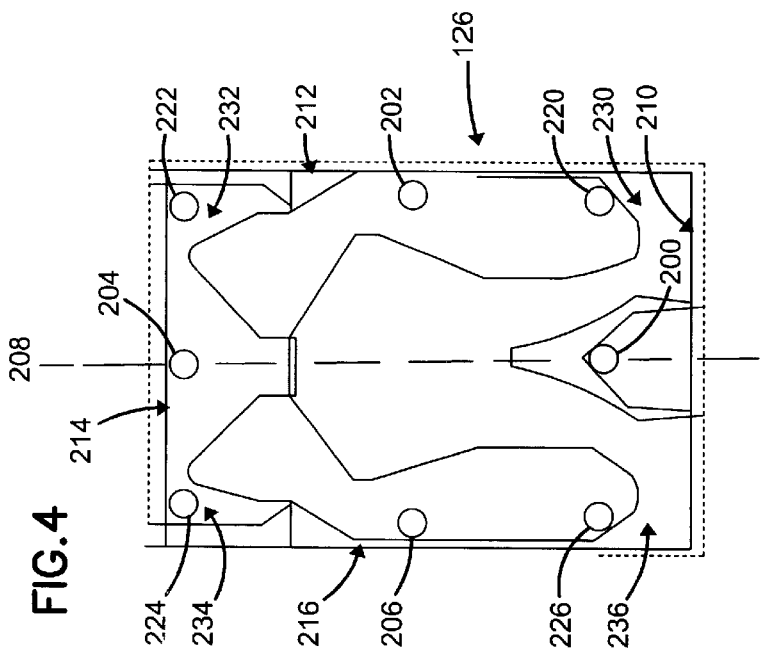
FIG. 4 shows the location of the diamond-patterned pads and corner-tipping pads on a SLIP head according to a preferred embodiment of the present invention.

Referring now to FIG. 4, which shows generally a SLIP head according to a preferred embodiment of the present invention. The SLIP head provides a diamond-pattern design of the pads on the head slider, i.e., SLIP head 126. The diamond-pattern design has four projections, or pads, 200, 202, 204, 206, positioned in a diamond shape on the SLIP head 126. The first 200 of the four projections is positioned along the longitudinal axis 208 of the SLIP head 126, proximate the rear edge 210 of the SLIP head 126. Pad 200 is important in directing tipping of the head 126 toward one of the corners of the SLIP head 126, and inhibiting direct rearward tipping onto the rear edge 210 of the SLIP head 126. The second pad 202 is positioned near the first longitudinal side 212 of the SLIP head 126, proximate the center point of the rear edge 210 and the front edge 214 of the SLIP head 126. The third pad 204 is positioned along the longitudinal axis 208 of the SLIP head 126, proximate the front edge 214 of the SLIP head 126. The fourth pad 206 is positioned near the second longitudinal side 216 of the SLIP head 126, proximate the center point of the rear edge 210 and the front edge 212 of the SLIP head 126.

The height of the pads is calculated according to several factors. Such factors include: allowing a large enough rear edge clearance 210; maximizing the clearance between the air-bearing surface and the disc 102 at all locations; and minimizing the interference between the pads 200, 202, 204, 206 and the disc 102 during operation (i.e., minimize the negative effect on the head-disc budget concern). All of these factors contribute to the level of stiction.

Suggested pad heights for one preferred embodiment are as follows: 400 Angstroms for the pad 200 along rear edge 210, and 550 Angstroms for the three other pads 202, 204, 206. These heights are exemplary only, given for the purpose of illustrating the concept behind this invention.

The shape of the pads may also vary. One example of a preferred shape would be circular, which would allow for efficient processing of the pads. Another consideration in the shape of the pads, as previously discussed, is to have as small as contact area with the disc as is possible under the circumstances. However, the pads can be made of most any shape.

The pads are typically made of diamond-like carbon ("DLC") because of DLC's wear-resistance, as well as its ease to manufacture and cost. However, the pads can also be made out of other materials such as boron carbide and alumina.

Now that the problem of bimodal stiction has been addressed, the consequential concern of mitigating stiction related to the directed corner tipping of the SLIP head 126 is addressed by adding secondary pads, called corner tip pads, 220, 222, 224 and 226. The corner tip pads, 220, 222, 224, 226, are positioned near the four corners 230, 232, 234, 236 of the SLIP head 126. In case of a tipping towards a corner, these corner tip pads 220, 222, 224, 226, prevent line contact and the formation of large menisci around the contact areas. A corner-tip pad will absorb the contact from the disc 102, rather than allowing a longitudinal edge 212, 216 of the SLIP head to contact the disc 102. Of course, as discussed previously, a longitudinal edge 212, 216 of the SLIP head has a larger contact area and would create a larger meniscus of the lubricant on the disc 102.

The height of the corner tip pads 220, 222, 224, 226, is also a trade-off between keeping them low enough to not contact the disc 102 during operation (positive head-disc spacing), but high enough to adequately limit the meniscus formation and resultant stiction when they contact the disc 102 during non-operation. Their height might also be chosen significantly lower than those of the diamond-pattern pads 200, 202, 204, 206, such that they do not increase the friction force between the SLIP head 126 and disc 102 during sliding. As an example, a height of 150 Angstroms might be used.

The shape and material considerations of the corner-tip pads 220, 222, 224, 226 are typically the same as those of the diamond-pattern pads 200, 202, 204, 206.

While the apparatus hereinbefore described is effectively adapted to fulfill the aforesaid objects, it is to be understood that the invention is not intended to be limited to the specific preferred embodiments of the magnetic head set forth above. Rather, it is to be taken as including all reasonable equivalents to the subject matter of the appended claims.

What is claimed is:

1. A head slider, attached to a magnetic head in a disc drive, the head slider having a first longitudinal side, a second longitudinal side, a rear edge, and a front edge, a longitudinal axis, and a first corner, a second corner, a third corner, and a fourth corner, the head slider comprising:

a first projection positioned on the longitudinal axis, proximate the rear edge of the head slider, wherein the first projection prevents the head slider from tipping toward the head slider's rear edge;

a second projection positioned proximate the center point of the rear edge and the front edge, near the first longitudinal side of the head slider;

a third projection positioned on the longitudinal axis, proximate the front edge of the head slider;

a fourth projection positioned proximate the center point of the rear edge and the front edge, near the second longitudinal side of the head slider;

wherein the first, second, third, and fourth projections form a diamond-like shape;

a fifth projection positioned proximate the first corner of the head slider;

a sixth projection positioned proximate the second corner of the head slider;

a seventh projection positioned proximate the third corner of the head slider;

an eighth projection positioned proximate the fourth corner of the head slider;

wherein the fifth, sixth, seventh, and eighth projections form a rectangular-like shape;

whereby the positioning of the fifth, sixth, seventh, and eighth projections prevent the first longitudinal side or the second longitudinal side from contacting the disc;

wherein the height of the first projection is less than that of the second, third, and fourth projections; and wherein the heights of the fifth, sixth, seventh, and eighth projections is less than that of the first projection.

2. The head slider of claim 1, wherein the shape of the projections are circular.

3. The head slider of claim 2, wherein the projections are made of diamond like carbon.

4. A head slider, attached to a magnetic head in a disc drive, the head slider having a first longitudinal side, a second longitudinal side, a rear edge, and a front edge, a longitudinal axis, and a first corner, a second corner, a third corner, and a fourth corner, the head slider comprising:

a first means positioned on the longitudinal axis, proximate the rear edge of the head slider, wherein the first means prevents the head slider from tipping toward the head slider's rear edge;

a second means positioned proximate the center point of the rear edge and the front edge, near the first longitudinal side of the head slider;

a third means positioned on the longitudinal axis, proximate the front edge of the head slider;

a fourth means positioned proximate the center point of the rear edge and the front edge, near the second longitudinal side of the head slider;

wherein the first, second, third, and fourth means form a diamond-like shape;

a fifth means positioned proximate the first corner of the head slider;

a sixth means positioned proximate the second corner of the head slider;

a seventh means positioned proximate the third corner of the head slider;

an eighth means positioned proximate the fourth corner of the head slider;

wherein the fifth, sixth, seventh, and eighth means form a rectangular-like shape; and wherein the heights of the fifth, sixth, seventh, and eighth means is less than that of the first means.

5. The head slider of claim 4 wherein the first, second, third and fourth means are projections.

6. The head slider of claim 5, wherein the shape of the projections are circular.

7. The head slider of claim 6, wherein the projections are made of diamond-like carbon.

8. The head slider of claim 4, whereby the positioning of the fifth, sixth, seventh, and eighth means prevent the first longitudinal side of the second longitudinal side from contacting the disc.

9. The head slider of claim 4, wherein the height of the first means is less than that of the second, third, and fourth means.

* * * * *

UNITED STATES PATENT AND TRADEMARK OFFICE
CERTIFICATE OF CORRECTION

PATENT NO.     : 6,538,849 B1                                                        Page 1 of 1
DATED          : March 25, 2003
INVENTOR(S)    : Serge Jacques Fayeulle and James Morgan Murphy It is certified that error appears in the above-identified patent and that said Letters Patent is hereby corrected as shown below:

Column 6,
Lines 60-61, "heights of the fifth, sixth, seventh, and eighth projections is less" should read -- respective heights of the fifth, sixth, seventh, or eighth projections are each less --

Column 8,
Lines 7-8, "heights of the fifth, sixth, seventh, and eighth means is less" should read -- respective heights of the fifth, sixth, seventh, and eighth means are each less --
Line 17, "side of" should read -- side or --

Signed and Sealed this

Ninth Day of September, 2003

JAMES E. ROGAN
*Director of the United States Patent and Trademark Office*